Sept. 29, 1925.
S. E. PONTICOS
CUP FILLING MACHINE
Filed Jan. 16, 1922
1,555,250
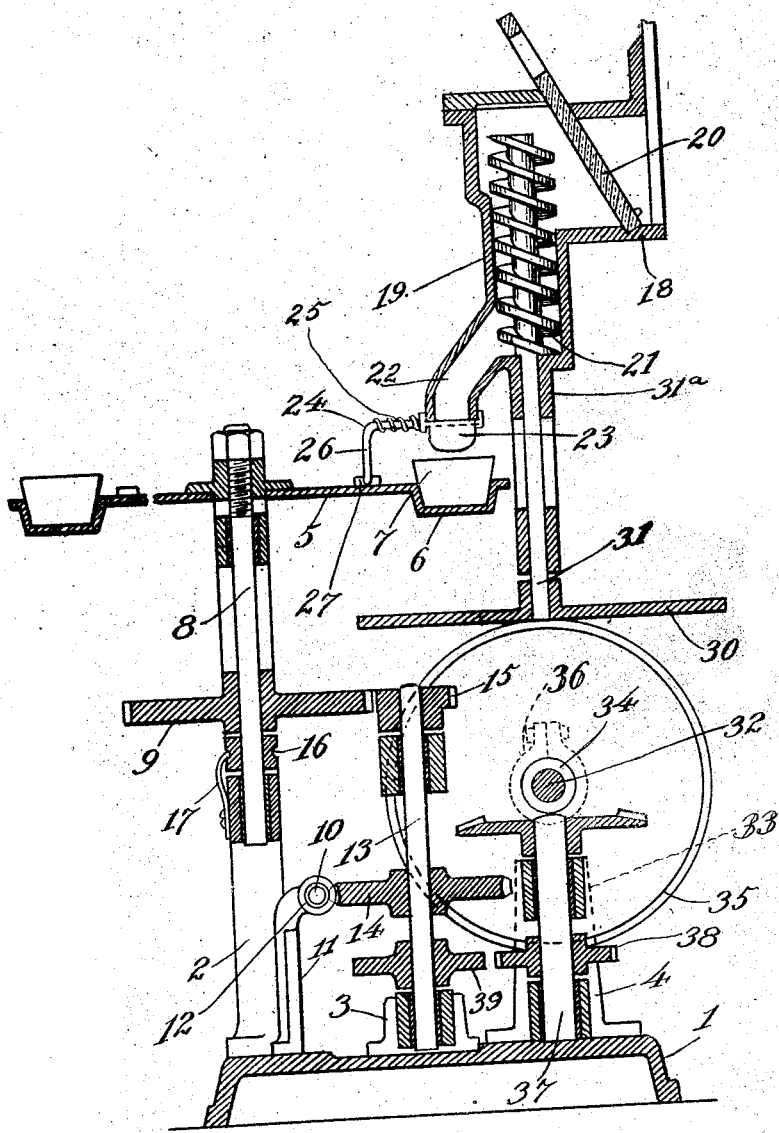
INVENTOR:
Steve E. Ponticos
BY
ATTORNEYS.

Patented Sept. 29, 1925.

1,555,250

UNITED STATES PATENT OFFICE.

STEVE E. PONTICOS, OF CINCINNATI, OHIO.

CUP-FILLING MACHINE.

Application filed January 16, 1922. Serial No. 529,473.

*To all whom it may concern:*

Be it known that I, STEVE E. PONTICOS, a citizen of the United States, and a resident of Cincinnati, in the county of Hamilton and State of Ohio, have invented certain new and useful Improvements in Cup-Filling Machines, of which the following is a full, clear, and exact description, reference being had to the accompanying drawings, forming part of this specification.

My invention relates to machines for filling cups with ice cream or other like material in an automatic manner, this machine comprising part of a general ice cream dispensing system, whereby the cream is given its preliminary freezing, then fed into a cup, and the cream frozen more solidly in the cup itself, said cup being used for dispensing the cream ultimately.

The present invention concerns mechanism which will be of value, not only in the system above briefly described, but also for dispensing ice cream and like materials generally.

My object in the mechanism to be described is to supply containers or cups automatically to a feeding device, which operates in timed relation to the supply means of the cups, so as to fill each cup with a measured quantity of the material.

My invention also concerns safety devices to prevent dripping, and hence loss of the material intermediate the filling operations.

These objects and other advantages to be noted I accomplish by that certain construction and arrangement of parts to be hereinafter more specifically pointed out and claimed.

In the drawings, the figure is a central vertical section taken through the machine.

Referring to the showing in the drawings which is intended as exemplary of my invention and not as an absolute limitation in details of its scope, I show a base 1 on which are standards 2, 3 and 4.

The standards are hollow and adapted to receive the bushings and shafts, which said shafts constitute the operating and supporting members of my device.

Referring to the cup transferring table, I have shown a disk 5 having at its periphery a series of interspaced depressions or hollows 6, in which are to be set the cups 7. The shape of the cups to be used will naturally be the guide for the shape of the depressions.

The disk 5 is supported on a vertical shaft 8, which is journaled in the standard 2, this shaft carrying a spur gear 9 thereon.

The motor shaft 10 (no motor being shown) is mounted in bracket arms as at 11, and has a worm 12 thereon. A driving shaft 13, journaled in the hollow standard 3, has a worm wheel 14 to mesh with the worm 12, and has also a mutilated spur gear 15 at its upper end lying alongside of the spur gear 9.

The result of the action of the mutilated gear will be to move the shaft 8 and hence the cup bearing table through a definite distance, and then let it stop until another intermeshing will pick it up and move it through a like distance again, and so on.

As a centering device the shaft 8 may have a series of small holes 16 interspaced around it, and a spring finger 17 on the standard 2 will engage in the holes at the point where the mutilated gear leaves its mesh, thereby holding the table in a given position until the next positive operation.

Mounted on the end 18 of an ordinary ice cream manufacturing machine, which it will be understood delivers the cream in the form of a partly frozen paste, which is intended to be frozen solid at some other point, is a delivery nozzle 19, access to which is controlled by a gate 20, which will be kept open during operations of the feeding mechanism.

In a cylindrical portion of this nozzle is a worm 21, which controls the amount of cream fed out of the spout 22 of the nozzle, this worm being intermittently operated during stops of the table.

The spout is directly over the stopping point for the cups on the table and has a valve 23, which is shown as an ordinary flap valve hinged over the end of the spout and having its pintle 24 fitted with a spring 25. This pintle is bent at 26 to come into a position of contact with a series of abutments or lugs 27 on the upper face of the plate, the arrangement of these abutments being such that as the forward or advancing edge of a cup comes under the spout, the flap valve will begin to open and will come fully open when the cup has come to its stopping point. The screw will then begin to feed, and when the screw stops and the table takes the first forward or advancing movement again, the abutment will pass under the pintle end 26 permitting the valve to flap shut.

The operating mechanism for the worm, as shown, comprises a friction disk 30 mounted on the end of the spindle 31 of the worm, said spindle being supported and journaled in the extension 31ª of the nozzle.

On a horizontal shaft 32, mounted on brackets on the base as indicated at 33, is a beveled gear 34 and a vertical friction disk 35, which contacts with the disk 30. The disk 35 includes in its structure a split collar 36 to engage the shaft 32, so that an adjustable position of the disk on the shaft may be maintained. Thus by shifting the disk along the shaft, its point of abutment against the disk 30 will be controlled and hence the speed and distance of feed of the worm can be accurately controlled.

The standard 4 mounts a shaft 37, which has a spur gear 38 meshing with a mutilated gear 39 on the shaft 13.

This mutilated gear thus drives the shaft 37 during a portion only of each operation, and the number of teeth on the mutilated gears 15 and 39 are to be arranged so that a sequence of operations will result with the gear 15 having its toothed portions in mesh while the gear 39 is out of mesh, and the teeth on the gear 39 in mesh while the gear 15 is out of mesh.

The timing will be readily arranged in machines of this character, dependent upon the time necessary to time a cup full of cream into the cup, together with enough of a pause after the worm has stopped for the cream fed by it to flow fully out of the spout.

It will naturally be possible to modify the exact structure described without departing from the essential ideas of the above described mechanism.

In use with my system of dispensing ice cream, the operator will fill the revolving table with cups and when he has determined that the cream is properly frozen into a preliminary paste, he will open the gate and start the motor. This will result in the worm and table taking up their sequential operations, and the operator will lift off the filled cups and supply empty ones until the desired number of cups have been filled.

Having thus described my invention, what I claim as new and desire to secure by Letters Patent, is:—

1. In a machine of the character described, the combination with a source of power, a revolving cup carrying table, having means thereon to engage in interspaced relation, a series of cups, a cream feeding nozzle, and a cream feeding mechanism therein, having also an intermittent movement under impulse from the source of power, said nozzle having a spout, a flap valve on the spout, an operating handle or the like for the flap valve, and lugs on the table to contact with said handle, and pass thereunder after effecting an opening of the flap.

2. In a container filling machine in combination with a revolving table with depressions therein for the retention of containers and a filling nozzle disposed in position to discharge into the containers at fixed positions, means for intermittently revolving the table and intermittently rotating an agitator disposed within the nozzle, and means for closing the nozzle subsequent to the intermittent rotation of the agitator and prior to the intermittent revolution of the table.

STEVE E. PONTICOS.